June 20, 1933.  E. G. McDONALD  1,915,000
BRAKE SHOE
Filed July 30, 1928

INVENTOR
Eugene G. McDonald
BY
Jn. W. McConkey
ATTORNEY

Patented June 20, 1933

1,915,000

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

BRAKE SHOE

Application filed July 30, 1928. Serial No. 296,349.

Figure 1:
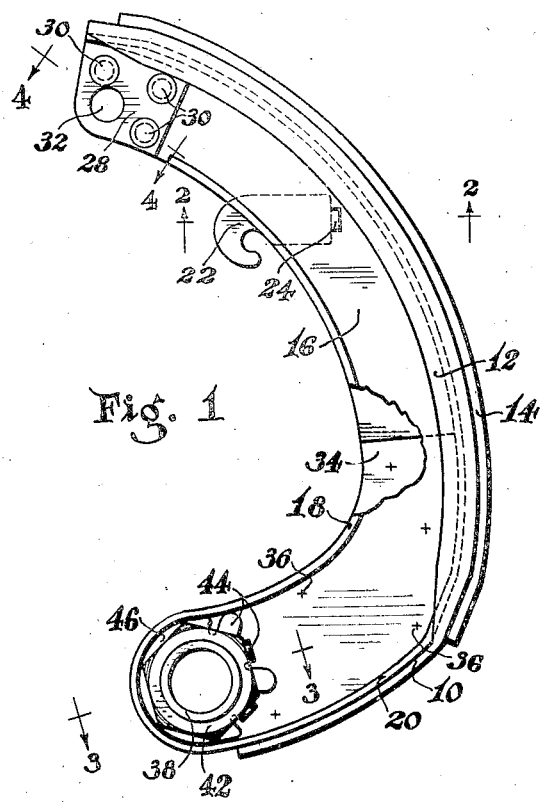

This invention relates to brake shoes, and is illustrated as a stamped steel welded-type shoe for a three-shoe internal expanding automobile brake. Various features of the invention relate to arranging a fitting such as a spring attachment with a laterally-extending portion projecting through and interlocking with an opening in the shoe web, to a novel mounting for a bushing forming a bearing for the anchor pivot; to an improved laminated construction at the unanchored end of the shoe facilitating the mounting thereon of antifriction rollers; and to other novel and desirable details of construction which will be apparent from the following description of one illustrative embodiment shown in the accompanying drawing, in which:

Figure 1 is a side elevation of the shoe; and

Figure 3:
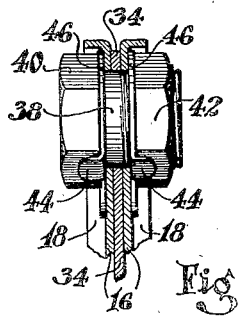
Figure 2:
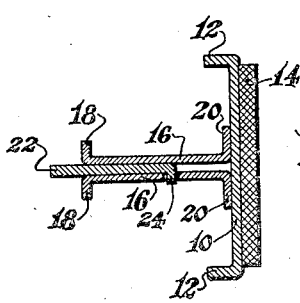
Figure 4:
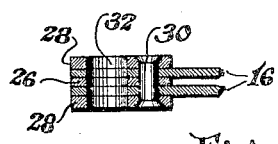

Figures 2, 3, and 4 are sections through the shoe respectively on the lines 2—2, 3—3, and 4—4 of Figure 1.

The shoe selected for illustration includes an outer rim or band 10, formed as a steel stamping having stiffening flanges 12 at its edges, and to which the brake lining 14 is riveted or otherwise secured. The rim 10 is stiffened by suitable webs 16, shown as separately formed as steel stampings and as having inner reinforcing flanges 18 and as having outer flanges 20 spot-welded or otherwise secured to the inner face of the rim 10. Preferably the two webs are spaced a short distance apart, and are parallel with each other.

A fitting or stamping 22, such as a hook-shaped attachment for the brake return spring, fits between the webs 16, and preferably has a portion such as a lug 24 projecting laterally through and interlocking with an opening in one of the webs 16.

At the upper or unanchored end of the shoe, there is a plate or stamping 26 between the webs 16, and two plates or stampings 28 on the outer sides of the webs 16, and spotwelded to the webs or secured thereto by rivets 30 or otherwise. Alined openings 32, in the two webs and three plates, form a bearing for a pivot pin (not shown) for the usual cam-engaging antifriction rollers (not shown).

At the lower or anchored end, the shoe is arranged to be mounted on a pivot. It has preferably a reinforcing plate 34 between the two webs 16, and shown secured thereto by spotwelds 36, the two webs 16 and the plate 34 being formed with alined openings for a bushing 38 which serves as an anchor pivot bearing. Bushing 38 has a non-circular head 40, and has a non-circular nut 42 threaded thereon on the opposite side of the shoe. Bushing 38 and nut 42 are held against turning by tongues or equivalent portions 44 of washers 46, one or more of each of which is bent into interlocking engagement with the head 40 or the nut 42. While washers 46 are held against turning by the flanges 18 and 20, which continue around the shoe end and merge into each other, they may if desired also be spotwelded or otherwise permanently secured to the webs 16.

While one illustrative embodiment has been described in detail, it is not my intention to limit the scope of the invention to that particular embodiment, or otherwise than by the terms of the appended claims.

I claim:

1. A brake shoe having a web, and a fitting formed with a part projecting laterally through an opening in the web.

2. A brake shoe having two webs, together with a fitting arranged between said webs and having a laterally-projecting part extending through an opening in one of said webs.

3. A brake shoe having two spaced-apart parallel webs, together with a fitting arranged between said webs and having a laterally-projecting part extending through an opening in one of said webs.

4. A brake shoe having spaced-apart parallel webs, together with a separately-formed reinforcing plate secured between said webs at one end of the shoe.

5. A brake shoe having spaced-apart parallel webs, together with a separately-formed reinforcing plate secured between said webs at one end of the shoe, and a pivot bearing extending through the two webs and said plate at said end of the shoe.

6. A brake shoe having a web extending as a pivot arm at one end of the shoe, a bushing passing through said arm adjacent its end, and a stamping held by said arm against turning and having a portion bent into interlocking engagement with the bushing to hold the bushing against turning.

7. A brake shoe having a web extending as a pivot arm at one end of the shoe, a bushing having a non-circular head and passing through said arm, and a stamping held by said arm against turning and having a portion bent into interlocking engagement with said head.

8. A brake shoe having a web extending as a pivot arm at one end of the shoe, a bushing mounted in the end of said arm, a non-circular nut threaded on said bushing, and a stamping held by said arm against turning and having a portion bent into interlocking engagement with the nut.

9. A brake shoe having two webs spaced apart at least at one end of the shoe, a plate fitted between and secured to said webs at their ends, and a pair of plates secured to the outer sides of said webs adjacent said ends, there being a bearing extending through the two webs and the three plates.

10. A brake shoe having two webs spaced apart at least at one end of the shoe, a plate fitted between and secured to said webs at their ends, and a pair of plates secured to the outer sides of said webs adjacent said ends, there being alined openings extending through the two webs and the three plates and forming a pivot bearing.

In testimony whereof, I have hereunto signed my name.

EUGENE G. McDONALD.